Patented June 19, 1951

2,557,109

UNITED STATES PATENT OFFICE 2,557,109

PREPARATION OF POLYMETAPHOSPHATE SOLUTIONS

Ralph K. Iler, Cleveland Heights, and Frederick J. Wolter, Cleveland, Ohio, assignors to E. I. du Pont de Nemours & Company, Wilmington, Del., a corporation of Delaware No Drawing. Application November 13, 1948, Serial No. 59,914

6 Claims. (Cl. 23—107)

This invention relates to the preparation of mixed polymetaphosphates and is more particularly directed to processes in which a solution of Kurrol salt is prepared by treating a Kurrol salt with a cation-exchanger which introduces a second cation by base exchange.

Solutions of potassium polymetaphosphate have heretofore been prepared by the addition of salts such as sodium chloride to the Kurrol salts. The resulting solutions are of moderately low viscosity because of the presence of the salts. Even when an effort is made to remove salts this is not feasible because complete separation cannot be effected and even small amounts of the salts markedly lower the viscosity of potassium polymetaphosphate solutions.

It is an object of this invention to provide processes for preparing polymetaphosphates which contain a second cation and which are of high viscosity. It is a further object to provide polymetaphosphates of high purity. It is a still further object to provide processes for producing solutions from the insoluble Kurrol salts. Still further objects will become apparent hereinafter.

The foregoing and other objects of the invention are attained by contacting a Kurrol salt with a cation-exchanger which contains a second cation which it is desired to introduce. By base exchange some of the cation in the salt will be replaced by the base carried by the cation-exchanger and a solution of mixed polymetaphosphate will be produced.

For example, if a suspension of potassium Kurrol salt is contacted with a cation-exchanger in its sodium form a solution of sodium-potassium polymetaphosphate will be produced.

The salt of a cation-exchanger is often effective when the soluble salts of the same cation are not. For example, a potassium Kurrol salt is solubilized by an ammonium or barium salt of a cation-exchanger but is not solubilized by a solution of ammonium or barium chloride.

Sodium or potassium polymetaphosphates for treatment according to the invention are thought to be linear polymers. The products are not soluble as such in water though, of course, they can be dissolved in water if they are changed partially or entirely into something else. Most, if not all, of the linear polymetaphosphates which are water-insoluble are also crystalline in structure. These polymetaphosphates suitable for use according to the invention are customarily called Kurrol salts.

The Kurrol salts and their preparation are well known in the literature and reference may be had, for instance, to an article by Karbe and Jander Kolloid-Beihefte 54, pp. 105–120 (1943).

The sodium Kurrol salt is rather difficult to prepare and it will ordinarily be preferred to use the potassium Kurrol salt.

Kurrol salts may be prepared according to the methods shown in the art. Perhaps the easiest way to prepare the potassium Kurrol salt is to heat potassium dihydrogen phosphate to produce a crystalline product. The product thus produced is water-insoluble as such but, like other polymetaphosphates suitable for use according to the invention, it can be solubilized by treatment with another salt such as sodium chloride or a soluble metaphosphate such as sodium hexametaphosphate.

The processes of the invention are applicable to Kurrol salts with still other cations, such as lithium for instance. The insoluble Kurrol salts can in each instance be solubilized if the cation is partly or wholly replaced by a second cation, such as sodium or potassium.

Now, as has been observed above, the polymetaphosphates which are to be treated according to the invention are insoluble in pure water but in certain cases can be dissolved if the water contains a dissolved salt which has a different cation from the Kurrol salt. The resulting solutions necessarily contain the anion of the dissolved salt and are consequently impure.

The removal of a portion of the cation of the Kurrol salt is accomplished by the use of a cation-exchanger. The use of cation-exchangers in various relations is generally well understood and is described, for instance, in the Bird Patent 2,244,325 and in the Hurd Patent 2,431,481. The literature is also full of references to cation-exchangers and to their use.

Any insoluble cation-exchanger may be used in processes of the invention and there may be used, for instance, the salts of sulfonated carbonaceous exchangers or of sulfonated or sulfited insoluble phenol-formaldehyde resins or acid-treated humic material, or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups. Cation-exchangers which are stable in their hydrogen forms are available commercially under such trade names as "Amberlite," "Ionex," "Zeokarb," "Nalcite," "Ionac," etc.

The exchanger can be initially in the acid form and can be converted to the form of its salt by contacting it with a suitable cation-containing material. It will be understood that in the acid form even moderately weak acids will often be sufficient and the acidity may be derived from carboxylic acids or even phenolic groups. In addition to the ion-exchangers as above described one may use the zeolites which contain the cation which it is desired to introduce. The zeolites are generally alumino-silicate containing exchangeable cations.

The exchanger is generally prepared in a granular form which is readily leached free of soluble acids or salts. If the exchanger is exhausted by use it may readily be converted to the acid form by washing with a solution of an acid such as hydrochloride, sulfuric, formic, sulfamic, carboxylic, or the like. Following this treatment, the exchanger may be brought into contact with a soluble compound of the cation which it is desired to introduce.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11 beginning at page 2830. The resin will be used by converting it to the salt of the cation which it is desired to introduce into the Kurrol salt.

The Kurrol salts are substantially insoluble in pure water as has been observed above, but base-exchange effects solubilization. The Kurrol salt molecule is visualized as polymeric and linear. With the potassium or sodium atoms arranged compactly the whole structure is such that water cannot find its way into the molecule or molecular system. The potassium or sodium cation of the Kurrol salt has a slight tendency to migrate and when there is present in the aqueous system the salt of an insoluble cation-exchanger, the cation can move into the molecule and take the place of the potassium or sodium atom of the Kurrol salt. After a number of cation atoms different from those of the Kurrol salt have found their way into the molecule, the different size of the two cations now present destroys the continuity and compactness of the original molecule. This allows water to "work its way" into the system and the compound becomes soluble without substantial modification of the anion. At least this explanation is in accordance ith the current theories of solubility as applied to certain organic polymers, and it seems reasonable as an explanation for the results obtained in applicant's processes.

Inasmuch as solubility appears to follow the introduction of a cation of a different size from that originally present in the Kurrol salt, it will be seen that there is a wide choice of cations available. One may use any cation other than the one originally present in the Kurrol salt.

The cation-exchanger may be in the form of the salt of any cation since, for purposes of effecting a reaction, the character of the cation is not important. Obviously, however, the cation should be selected with some view to the final composition desired and one should not introduce cations which would render the compounds unsuitable for the proposed use. Also, as noted below, the cation must be one which forms a stable salt at the pH below indicated. Trivalent metals do not form such salts.

The salts of the cation-exchanger should of course be stable at the pH of the ion-exchange; that is, they should be stable at some point in the range of pH 5 to 11. Metals, for instance, which are to serve as the cation of the cation-exchanger should preferably be one the salts of which do not hydrolyze markedly at a pH of about 5. In other words, as will be apparent, the salts of the metal should ordinarily be stable at some point in the range from 5 to 11. Otherwise, as stated, it may be observed that the base-exchange material is a salt stable at pH 5 of an insoluble cation-exchanger. If the cation precipitates at pH 5 as the metal hydroxide then obviously it would not be suitable.

As cations for the formation of salts of base-exchangers there may be suggested sodium or potassium, the one to use in each instance being determined by the cation of the Kurrol salt. Ammonia may be used, and there may be used metal cations such as zinc, lithium, magnesium, calcium, cupric, cesium, beryllium, strontium, cadmium, barium, lead (in the divalent state), ferrous, cobaltous, and nickelous ions.

The cation may be organic and any organic cation may be used which will form a salt of a base-exchanger which is stable at pH 5. As organic substituents there may be mentioned tetramethyl and tetraethyl ammonium groups. Phenyl-trimethylammonium and benzyl-trimethylammonium and tetraethanol-ammonium groups may similarly be used. Various amines can be employed and there can be used diethylamine, trimethylamine, and the ethanolamines, such as triethanolamine. The base used must be strong enough in each instance to form a salt with the base-exchanger at some point in the pH range of 5 to 11.

While trivalent metals may not be used to solubilize Kurrol salts according to the invention, small amounts of such metals may be introduced into compounds solubilized with other cations. This may be done by using a salt of the metal of valence greater than two with an ion-exchanger.

The extent of the replacement of the cation of the Kurrol salt with a second cation may be widely varied. About two-thirds of the potassium or sodium of the Kurrol salt must be replaced by a second cation or cations in order to effect solubilization. If a polyvalent metal is used then if more than about 85% of the metaphosphate ions are satisfied with the polyvalent metal there will be cross-linking and insolubilization or precipitation of the compound. Under some circumstances this may be desired as a method of forming such materials.

There is no limit to the amount of a second cation which can be introduced and if sodium or potassium, for instance, is the second cation, it can be added right up to complete replacement. While about two-thirds of the potassium or sodium of the Kurrol salt must be replaced before a solution is obtained, one can then increase the amount of the cation originally present by the use of an appropriate resin without effecting precipitation. It will be seen that following such a practice one could start with a potassium Kurrol salt, effect solution by the use of a salt of a base-exchanger, and then completely remove the second cation while supplying potassium. The final product would be a soluble potassium Kurrol salt because once in solution there is no reversion of the Kurrol salt back to the original, insoluble molecular structure.

From the foregoing it will be apparent that by use of processes of the invention one can readily produce a wide variety of polymetaphosphates which have one or two or even more cations in any desired proportion.

In the use of the cation-exchangers the Kurrol salt will ordinarily be added as a solid to water. The concentration is comparatively unimportant, tho no more than about 10% of polymetaphosphate by weight should be used or the resulting product solution will be too viscous to handle. It is also preferred to use at least enough of the Kurrol salt to produce at least a one-half per cent solution, or else the reaction will proceed somewhat too slowly.

It is desirable that the reaction be conducted as rapidly as is convenient and the temperature should be maintained as low as is possible. In any event, it is preferred that the temperature be no higher than about room temperature and in any event it is preferred that the temperature should not rise above about 50° C. The product tends to become degraded with very slow reaction or with high temperatures.

The pH of the system should be maintained between pH 5 and 11. The pH can be controlled by the addition of an appropriate amount of the second cation if the pH is below the desired range. If the pH is above the desired range, some cation-exchanger in hydrogen form can be used.

For instance, if a cation-exchanger in sodium form is used for the solubilization of a potassium Kurrol salt, then sodium hydroxide can be used to raise the pH and the acid form of a cation-exchanger can be used to lower the pH.

The manipulation of the cation-exchanger can be effected in a manner already generally understood in the art. The suspension of Kurrol salt may be passed thru a column of an appropriate cation-exchanger or it may be contacted with successive portions of a cation-exchanger. It is to be noted that some excess of the cation-exchanger will be needed to secure the desired amount of a second cation in the polymetaphosphates.

The products produced can be used in film-forming compositions, in binding compositions, and in coating compositions.

In order that the invention may be better understood, reference should be had to the following illustrative examples:

*Example 1*

A high molecular weight potassium polymetaphosphate was prepared by heating pure potassium dihydrogen phosphate to 675° C. for forty minutes. The resulting crystalline product was quickly cooled. This product is a potassium Kurrol salt.

An ammonium ion-exchange resin was prepared by neutralizing the hydrogen form of Nalcite HCR resin by the addition of ammonium hydroxide until the supernatant fluid had a pH of 9.5. This resin salt still contained sodium ions in an amount equal to about 10% of its capacity; this sodium was present in the acid resin used. To such a suspension containing 10 parts by weight of the HCR resin in 50 parts by weight of water there was added 1 part by weight of the water-insoluble Kurrol salt. The mixture was thoroughly agitated. The Kurrol salt passed rapidly into solution. The viscous solution was recovered by filtration from the resin.

*Example 2*

Fifty parts by weight of Nalcite HCR resin, 40 parts by weight of magnesium acetate

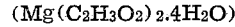

and 200 parts by weight of water were slurried together for two hours and the resin was then filtered in water. This resin was suspended in water and gave a pH, measured in the supernatant fluid, of 5.5. Magnesium oxide was added to raise the pH to 9.7 in order to insure that the resin was saturated with magnesium ions. This magnesium saturated resin was then filtered and dried in the atmosphere.

To a suspension of one part by weight of finely pulverized potassium Kurrol salt ($KPO_3$) in 250 parts by weight of water 15 parts by weight of magnesium resin were gradually added with stirring for one-half hour at ordinary temperatures. During this time the Kurrol salt dissolved giving a solution having a viscosity of 34 centipoises at 25° C. and containing 0.076% phosphorus, 0.021% potassium and 0.025% magnesium.

*Example 3*

Solubilization of Kurrol salt with a lithium resin salt was effected by stirring 4 parts by weight of $KPO_3$ in 1000 parts of water along with 10 parts of the lithium salt of Nalcite HCR resin. The Kurrol salt dissolved rapidly and completely to give a viscous solution.

*Example 4*

A sodium ion-exchange resin was prepared by neutralizing the hydrogen form of Nalcite HCR resin by the addition of sodium hydroxide until the supernatant fluid had a pH of 8.5. To this suspension of resin containing 10 parts by weight of HCR resin and 50 parts by weight of water there was added one part by weight of pulverized Kurrol salt ($KPO_3$) and the mixture was thoroughly stirred at 25° C. Almost immediately the Kurrol salt started to pass into solution as evidenced by a marked increase in the viscosity of the mixture.

After all the $KPO_3$ had passed into solution the viscous liquid was separated from the resin by filtration through a woven glass cloth yielding a clear, extremely viscous product.

By this procedure concentrations of solubilized Kurrol salt could be prepared up to 10% by weight expressed as $KPO_3$. This concentration appears to be about as high as can conveniently be used in the case of the high molecular weight Kurrol salt since above this concentration the viscosity of the solution is so high that it is very difficult to separate the resin by conventional filtration. However, if special equipment is used for filtering the very viscous product, or if a type of Kurrol salt is used which gives less viscous solutions, as for example Kurrol salts prepared at temperature below 500° C., stronger solutions may be prepared.

The solutions obtained in this manner are characterized by the fact that they contain no contaminating salts and therefore exhibit a high viscosity in aqueous solution.

*Example 5*

The solubilization of Kurrol salt by ion-exchange with the tetramethylammonium salt of an ion-exchange resin was conducted as follows:

The tetramethylammonium salt of Nalcite HCR resin was prepared by neutralizing the acid form of the resin with tetramethylammonium hydroxide until a constant pH of 8 was noted in the supernatant liquid; 1.47 ccs. of 1.110 normal solution of tetramethylammonium hydroxide was required per 1.0 gram of air-dried hydrogen resin. This resin still contained between 5 and 20% of its total ion-exchange equivalent as the sodium salt. This was due to the fact that the sodium was only incompletely removed in the regeneration of the acid resin from the sodium salt form in which the resin was received. The tetramethylammonium resin prepared in the above manner was separated from the water and used in a wet-drained condition.

For the preparation of the tetramethylammonium polymetaphosphate solution by the ion-exchange solubilization of $KPO_3$ 40 parts by weight of wet-drained tetramethylammonium ion-exchange resin were slurried into 196 parts by weight of water along with 4 parts by weight of finely pulverized potassium Kurrol salt. This mixture was stirred for 25 minutes at which time all the $KPO_3$ had passed into solution. This viscous solution was separated from the resin by filtration. When the solution was dried it yielded a clear, transparent, strong, self-supporting plastic film.

Instead of using a tetramethylammonium salt of a cation-exchanger an attempt was made to dissolve the potassium Kurrol salt with the corresponding quaternary ammonium chloride. In a series of experiments 100 parts by weight of water, 2 parts by weight of pulverized Kurrol salt, were suspended, and from one up to ten parts by weight of tetramethylammonium chloride was added. The mixtures were stirred for one hour without appreciable solubilization of the Kurrol salt. The viscosity of the water did not increase noticeably and the suspended $KPO_3$ did not change in appearance.

Example 6

Phenyltrimethylammonium salt of an ion-exchange resin may also be used for effecting the solution of the water-insoluble Kurrol salt. The phenyltrimethylammonium salt of the resin may be prepared by neutralizing the hydrogen form of the resin by the free base in a manner similar to the procedure described above. In this case it is essential to allow the acid resin to stand in contact with the phenyltrimethylammonium hydroxide solution for several hours in order to be certain that all the hydrogen ions in the resin are neutralized. This resin salt also contains between 5 and 20% of the sodium resin salt, as described in Example 5.

The quaternary ammonium salt of the resin prepared in this fashion is then separated from the solution, washed with distilled water and then suspended in distilled water using 20 parts by weight of the wet-drained resin salt per 200 parts by weight of water. To this suspension is then added 2 parts by weight of finely divided potassium Kurrol salt. The mixture is adjusted to about pH 8 by the addition of small quantities of phenyltrimethylammonium hydroxide or, if necessary, by the addition of a small amount of the Nalcite HCR resin in its hydrogen form. After the mixture is stirred for one hour, it is found that the Kurrol salt has passed completely into solution. The viscous solution is separated from the resin by filtration. This solution so obtained when dried at the ordinary temperature in a thin layer gave an extremely soft, flexible, rubbery, self-supporting film.

Example 7

By a procedure identical with that described in Example 5, except that benzyltrimethylammonium hydroxide was used instead of phenyltrimethylammonium hydroxide, a benzyltrimethylammonium polymetaphosphate solution was obtained. In this case the Kurrol salt passes into solution somewhat less rapidly and is preferred to use about 27 parts by weight of the wet-drained quaternary ammonium resin salt instead of 20 parts by weight as shown in Example 6. The resulting solution of the polymer gave a soft, flexible, rubbery, self-supporting film.

Example 8

Mixtures of ion-exchange resin can be used to convert the water-insoluble Kurrol salt to a soluble form. For example, a mixture of the tetramethylammonium salt of Nalcite HCR resin and the magnesium salt of the same resin may be used. The following proportions of the wet-drained resins were effective:

(a) Twenty parts by weight of tetramethylammonium resin and 10 parts by weight of the magnesium resin salt per 1.5 parts by weight of $KPO_3$ and 150 parts by weight of water.

(b) Twenty parts by weight of magnesium resin salt and 10 parts by weight of the tetramethylammonium salt of the resin with the above quantities of $KPO_3$ and water.

(c) Thirty parts by weight of tetramethylammonium resin and 3 parts of magnesium resin salt along with 3 parts of Kurrol salt and 150 parts of water.

In all cases the $KPO_3$ readily passed into solution with no residual insoluble Kurrol salt.

Example 9

Kurrol salt may be dissolved by treatment with the tetraethylammonium salt of ion-exchange resin. Tetraethylammonium salt of a resin containing carboxylic acid groups, IR–C50, was prepared by neutralizing the acid form of this resin to a pH of 10 with free tetraethylammonium hydroxide. In this case, the pH measured on the supernatant liquid. The resin is then separated from the aqueous phase and, after a brief wash with distilled water, is suspended in distilled water along with pulverized Kurrol salt with constant stirring. The $KPO_3$ passes into solution within 30 minutes.

Example 10

Kurrol salt was solubilized by the tetraethanolammonium salt of Nalcite HCR resin by a procedure similar to that described in Example 5. The Kurrol salt dissolved readily.

Example 11

The calcium salt of Nalcite HCR was prepared by neutralizing the acid form of the resin with calcium hydroxide until the pH of the supernatant liquid remained between 8 and 9. The neutralized resin was separated from the aqueous phase by filtration. The neutralized calcium salt was recovered by filtration. To a suspension of 2 parts of pulverized Kurrol salt in 150 parts by weight of water there were added 10 parts by weight of the wet-drained calcium salt of the resin. The mixture was stirred for thirty minutes. At the end of this time the Kurrol salt had almost completely dissolved yielding a slightly viscous solution. This solution when dried on a glass plate gave an adherent, hard film which dissolved only very slowly in water.

Example 12

By a method similar to that of Example 11 using a barium salt of the Nalcite HCR resin prepared by neutralizing the acid resin with $$Ba(OH)_2$$

a Kurrol salt ($KPO_3$) was solubilized to give a viscous solution which dried to a hard transparent, brittle film which dissolved only slowly in water.

While the barium resin solubilized the Kurrol salt the latter could not be dissolved in a dilute solution barium salt such as barium chloride.

Example 13

By a method similar to that described in Example 11, a lead salt of Nalcite HCR resin was prepared by treating the air-dried acid resin twelve times alternately with an exces of lead acetate solution and distilled water. In 200 parts by weight of water 2 parts by weight of Kurrol salt and 20 parts of wet lead salt of the resin were stirred for 30 minutes. The pH of the slurry initially was 3.8 and was raised to 5.3 by adding a small portion of lead acetate solution. The Kurrol salt passed completely into solution. Lead acetate solution did not solubilize the Kurrol salt in the absence of resin.

We claim:

1. In a process for making a polymetaphosphate, the step comprising treating an aqueous suspension of a Kurrol salt with a salt stable at pH 5 of an insoluble cation-exchanger, the cation of the salt of the exchanger being different from that of the Kurrol salt, whereby a soluble polymetaphosphate is formed from the said suspended Kurrol salt.

2. In a process for making a polymetaphosphate, the step comprising treating an aqueous suspension of a Kurrol salt at pH 5 to 11 with a salt stable at pH 5 of an insoluble cation-exchanger, the cation of the salt of the exchanger having a valence less than three and being different from that of the Kurrol salt, whereby a soluble polymetaphosphate is formed from said suspended Kurrol salt.

3. In a process for making a polymetaphosphate, the step comprising treating an aqueous suspension of a potassium Kurrol salt at pH 5 to 11 with a salt stable at pH 5 of an insoluble cation-exchanger, the cation of the salt of the exchanger being different from that of the Kurrol salt, whereby a soluble polymetaphosphate is formed from said suspended Kurrol salt.

4. In a process for making a polymetaphosphate, the step comprising treating an aqueous suspension of a potassium Kurrol salt at pH 5 to 11 with an insoluble cation-exchanger in sodium form, whereby a soluble polymetaphosphate is formed from said suspended Kurrol salt.

5. In a process for dissolving a Kurrol salt, the step comprising treating an aqueous suspension of the salt with a salt stable at pH 5 of an insoluble cation-exchanger, the cation of the salt of the exchanger being different from that of the Kurrol salt.

6. In a process for dissolving a potassium Kurrol salt, the step comprising treating an aqueous suspension of the salt at pH 5 to 11 with an insoluble cation-exchanger in sodium form.

RALPH K. ILER.
FREDERICK J. WOLTER.

REFERENCES CITED

The following references are of record in the file of this patent:

UNITED STATES PATENTS

| Number | Name | Date |
|---|---|---|
| 1,978,447 | Austerweil et al. | Oct. 30, 1934 |
| 2,130,557 | Munter | Sept. 20, 1938 |
| 2,296,716 | Jelen | Sept. 22, 1942 |
| 2,414,742 | Jackson | Jan. 21, 1947 |

FOREIGN PATENTS

| Number | Country | Date |
|---|---|---|
| 547,019 | Great Britain | Aug. 10, 1942 |

OTHER REFERENCES

Serial No. 434,621, Rudy et al. (A. P. C.), Pub. June 1, 1943.

Audrieth et al., Journal of Chem. Ed., Feb. 1948, pp. 80 and 81.

Kunin, Industrial & Engineering Chem., vol. 40, No. 1, Jan. 1948, pp. 41–45.